Figure 1:
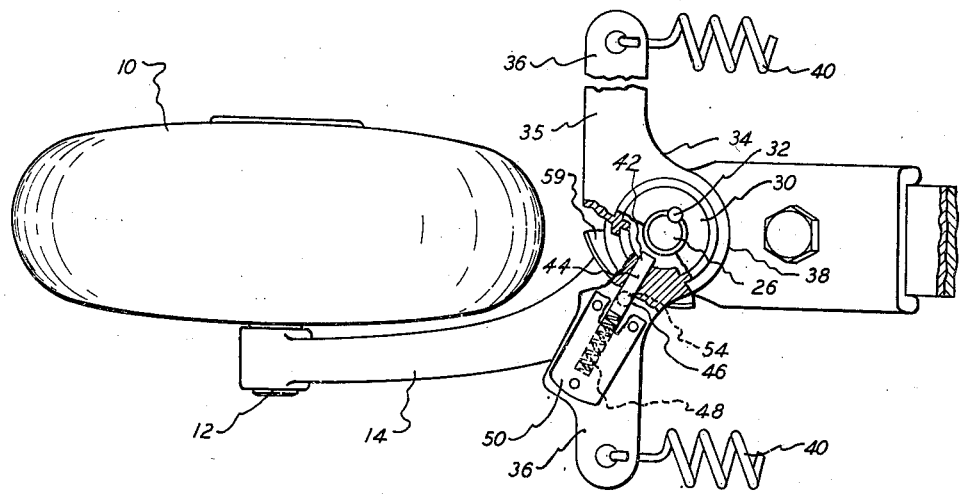

Feb. 21, 1950      B. D. MAULE      2,498,112

TAIL WHEEL MOUNTING

Filed Oct. 3, 1945

Inventor

BELFORD D. MAULE

By Beaman & Langford

Attorneys

Patented Feb. 21, 1950

2,498,112

UNITED STATES PATENT OFFICE 2,498,112

TAIL WHEEL MOUNTING

Belford D. Maule, Michigan Center, Mich.

Application October 3, 1945, Serial No. 620,053

2 Claims. (Cl. 244—50)

The present invention relates to caster type wheels for airplanes, steerable by co-ordination of the rudder mechanism, being an improvement over the construction shown in my Patent No. 2,344,157, granted March 14, 1944.

As its principal object, the present invention resides in the improved details of construction which facilitate the manufacture and improve the performance over that construction disclosed in my aforesaid patent. These improved details of construction include a new cam arrangement for releasing the clutch between the steering mechanism and the caster action of the wheel, as well as an improvement in the assembly arrangement of the associated parts.

Figure 2:
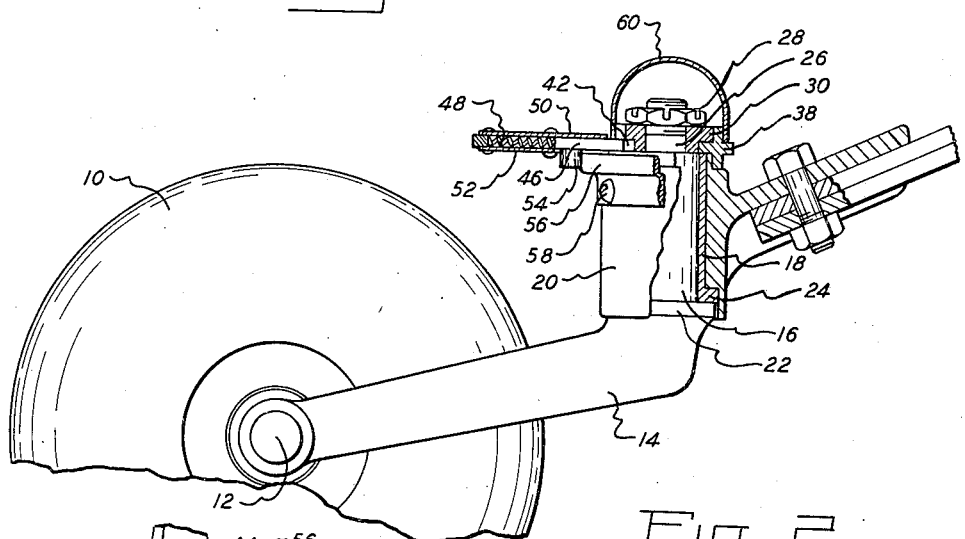
Figure 3:
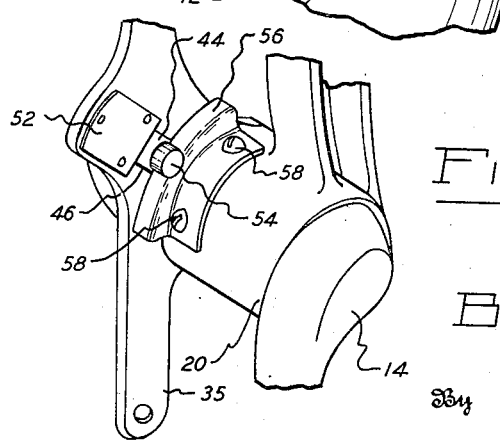

In the drawing,

Fig. 1 is a plan view of the steerable tail wheel assembly, with a portion shown in broken cross section, Fig. 2 is a side elevational view partly shown in broken cross section with a locking pin shown withdrawn by the cam, and Fig. 3 is a fragmentary perspective view as viewed from below and at an angle.

Referring to the drawing, the wheel 10 is supported on an axle 12 carried by the swivel arm 14. The swivel post 16 is integral with the arm 14 and is journaled in the bushing 18 for full swivel action. The caster wheel action of such an arrangement is well known and is more fully described in my aforesaid patent. Preferably the bushing 18 is press fitted in the housing 20. An annular flange 22 on the post 16 abuts a flange end 24 of the bushing 18. At the upper end, the post 16 is of reduced diameter to provide a threaded stud 26 to receive a nut 28. Piloted on the stud 26 is a flange collar 30. A pin 32 inserted in a hole located between the collar 30 and the stud 26 functions as a drive key between these parts to cause the collar 30 and stud 26 to rotate together as a unit.

The steering bracket 34 has arms 35 and 36 and a central collar portion 38 which is rotatably supported between the bushing 18 and the collar 30 and is piloted on the housing 20. The nut 28 holds the entire assembly together. Movement of the arms 35 and 36 is controlled by suitable steering cables having resilient end connections 40 which are co-ordinated with the rudder mechanism of the airplane.

In order to free the post 16 for full swiveling action, a clutch is provided between the bracket 34 and the post 16. Such full swiveling action is desired in parking the airplane and it also prevents scuffing of the wheel and undue strain being placed on the supporting structure for the wheel assembly if the full castering were not possible. In the illustrated form, a clutch has been provided between the assembled parts by providing a radial notch 42 in the collar 30. A locking pin 44 is axially projected in a slot 46 by a spring 48 into interlocking relationship with the notch 42. Plates 50 and 52 on opposite sides of the bracket 34 guide the pin 44 in the slot 46. The retracting means for withdrawing the pin 44 from the notch 42 comprises a cam follower 54 affixed to the pin 44. A sheet metal stamping 56 assembled to the housing 20 in any desired angular position by screws 58 constitutes the operating cam for withdrawing the pin 44 upon a predetermined swiveling movement of the arm 14.

In Fig. 1, the grease cap 60 of Fig. 2 has been removed, as has the nut 28, all for the sake of clarity.

The cam 56 is laid out along an arc extending through approximately 120° with the lobes of the cam 56 being at the ends of the arc. When the bracket 34 is oscillated through the normal steering arc, the cam follower 54 will traverse the intermediate portion of the cam 56 with insufficient movement to withdraw the pin from the notch 42. Thus the post 16 and bracket 34 are locked together by the pin 44 to permit steering of the wheel 10 in co-ordination with the rudder mechanism. However, any castering action of the wheel 10 beyond the steering arc will bring the cam follower 54 upon one or the other of the lobes of the cam 56, withdrawing the pin 44 from the notch 42 to permit full swivel of the wheel 10. It will be understood that the spring 48 continuously urges the pin 44 toward the notch 42, with the result that the pin 44 will engage with the notch 42 whenever it is permitted through the location of the follower 54 on the cam 56.

As is more clearly shown in Fig. 2, the grease cap 60 telescopes with an annular flange on the collar portion 38. Grease packed into the cap 60 will lubricate the post 16 for rotation in the sleeve 18, as well as such other parts between which relative movement takes place. The cap 60 also acts as a dirt seal.

It will readily appear to those skilled in the art that there are certain definite advantages in having the cam 56 in the form of a stamping attachable to the housing in lieu of having it an integral part thereof, as shown in my aforesaid patent. With the present construction all machining of the cam is eliminated, as it can be used as it comes from the metal pressing operation. Moreover, the location of the cam may be varied or different cams employed without making any change in the casting pattern for the housing.

Having thus described my invention, what I desire to cover by Letters Patent and claim is:

1. In a steerable full caster tail wheel assembly, a fixed housing, a part completely rotatable in said housing, a steering part supported from said housing, a clutch between said steering part and said first part including a cam follower, a sheet metal cam attached to said housing on the outer surface thereof and presenting an arcuate surface, said cam having lobes defined at opposite ends of said arcuate surface and an intermediate portion between said lobes, said cam follower engaging said lobes to actuate said clutch at the limits of oscillation of said steering part, said cam follower traversing said intermediate portion with said steering part effectively clutched with said first part.

2. In a steerable full caster tail wheel assembly, a fixed housing, a part completely rotatable in said housing, a sleeve press fitted in said housing in which said part is rotatably supported, a steering part telescoping with said part and said housing, a flange collar on said first part and imposed upon said steering part for relative rotation, a drive connection between said collar and said first part, and clutch connections between said steering part and said collar including a cam follower, and a cam upon said housing with which said cam follower engages for operating said clutch connection.

BELFORD D. MAULE.

REFERENCES CITED

The following references are of record in the file of this patent:

UNITED STATES PATENTS

| Number | Name | Date |
| --- | --- | --- |
| 2,114,839 | Gwinn | Apr. 19, 1938 |
| 2,266,098 | Trader | Dec. 16, 1941 |
| 2,329,823 | Camburn | Sept. 21, 1943 |
| 2,344,157 | Maule | Mar. 14, 1944 |